US009182223B2

United States Patent
Hopp

(10) Patent No.: US 9,182,223 B2
(45) Date of Patent: Nov. 10, 2015

(54) DEVICE FOR MEASURING THE ROTATING ANGLE OF TWO OBJECTS ROTATING AROUND AN AXIS IN RELATION TO EACH OTHER

(71) Applicant: SICK STEGMANN GmbH, Donaueschingen (DE)

(72) Inventor: David Hopp, Donaueschingen (DE)

(73) Assignee: SICK STEGMANN GMBH, Donaueschingen (DE)

( * ) Notice: Subject to any disclaimer, the term of this patent is extended or adjusted under 35 U.S.C. 154(b) by 88 days.

(21) Appl. No.: 13/869,687

(22) Filed: Apr. 24, 2013

(65) Prior Publication Data
US 2013/0286394 A1  Oct. 31, 2013

(30) Foreign Application Priority Data

Apr. 27, 2012 (EP) .................................. 12166059

(51) Int. Cl.
*G01B 11/26* (2006.01)
*G01D 5/34* (2006.01)
*G01D 5/347* (2006.01)

(52) U.S. Cl.
CPC ................ *G01B 11/26* (2013.01); *G01D 5/341* (2013.01); *G01D 5/344* (2013.01); *G01D 5/3473* (2013.01)

(58) Field of Classification Search
USPC ........ 356/364–369; 250/231, 16, 225, 559.09
See application file for complete search history.

(56) References Cited

U.S. PATENT DOCUMENTS

| 5,317,149 | A  * | 5/1994  | Uebbing et al. ......... 250/231.14 |
| 5,815,269 | A  * | 9/1998  | Crabb et al. .................. 356/364 |
| 6,031,613 | A  * | 2/2000  | Washington .................. 356/364 |
| 7,377,435 | B2 * | 5/2008  | Wei .............................. 235/454 |
| 7,622,707 | B2 * | 11/2009 | Chin et al. ............... 250/231.13 |
| 7,777,879 | B2 * | 8/2010  | Baxter et al. .................. 356/364 |
| 7,940,380 | B1 * | 5/2011  | Benner, Jr. .................... 356/138 |
| 8,797,521 | B2 * | 8/2014  | Mutschler ..................... 356/138 |

(Continued)

FOREIGN PATENT DOCUMENTS

| DE | 201 02 192 U1 | 6/2001 |
| FR | 2 916 042 A1 | 11/2008 |

(Continued)

OTHER PUBLICATIONS

European Search Report in the counterpart European Application No. 12 166 059.1 issued on Oct. 5, 2012, six (6) pages.

*Primary Examiner* — Sang Nguyen
(74) *Attorney, Agent, or Firm* — Nath, Goldberg & Meyer; Jerald L. Meyer; Rury L. Grisham

(57) ABSTRACT

A device for measuring the rotating angle of two objects rotating in relation to each other around an axis includes a light source and a polarizer, whereby the light source and the polarizer rotate in relation to each other as function of the rotating angle. The device also includes a receiver measuring the luminous intensity reflected by the polarizer, to produce a signal dependent on the rotating angle. The receiver has at least one initial reception element and the light emitted by the light source is either polarized or becomes polarized. A polarizing filter with an initial direction of polarization is positioned in front of the first reception element. At least one element casting a shadow is positioned in front of the receiver and the receiver has at least one quadrant diode. The position and/or shape of the shadow are varied on the receiver over a rotation of 360°.

15 Claims, 6 Drawing Sheets

(56) References Cited

U.S. PATENT DOCUMENTS

| | | | |
|---|---|---|---|
| 8,891,083 B2 * | 11/2014 | Hopp et al. | 356/364 |
| 2005/0002032 A1 * | 1/2005 | Wijntjes et al. | 356/364 |
| 2005/0211886 A1 | 9/2005 | Chin et al. | |
| 2012/0002018 A1 * | 1/2012 | Hiramoto et al. | 348/49 |
| 2012/0235672 A1 * | 9/2012 | Basler | 324/207.14 |

FOREIGN PATENT DOCUMENTS

| | | |
|---|---|---|
| GB | 1 498 409 A | 1/1978 |
| JP | 6 018287 A | 1/1994 |

\* cited by examiner

DEVICE FOR MEASURING THE ROTATING ANGLE OF TWO OBJECTS ROTATING AROUND AN AXIS IN RELATION TO EACH OTHER

BACKGROUND

The invention relates to a device for measuring the rotating angle of two objects rotating around an axis in relation to each other, in accordance with the preamble of patent claim 1.

Identifying the rotating angle of two objects rotating around an axis in relation to each other, for example, the rotating angle of a motor shaft rotating relative to a stationary element, may take place with the aid of a contact-free optical sensor, as based on the polarizing properties of light. Examples of such devices are disclosed by DE 201 02 192 U1, EP 2 187 178 A1, EP 1 507 137 A1, or U.S. Pat. No. 7,777,879.

Devices known to the prior art for measuring the rotating angle of two objects rotating around an axis in relation to each other have a light source assigned to one of the objects; a polarizer assigned to the other object, such that the light source and the polarizer rotate in relation to each other as function of the rotating angle; and a receiver which measures the reflected luminous intensity, or that which passes through the polarizer, in order to produce a signal dependent on the rotating angle. Here the receiver has an initial reception element, and the light emitted by the light source is either polarized or becomes polarized, and/or a polarizing filter with an initial direction of polarization is positioned in front of the first reception element. The relative rotation between a light beam polarized in linear fashion and a linear polarizer brings about a modulation of the luminous intensity. This modulation can be detected by a receiver, and from said modulation the relative angular positioned can be determined. If the polarizer is positioned on a rotating object, e.g., a motor shaft, the rotating angle of the rotating object can be determined. Based on the physical properties of the polarization, the angle-dependent signals have two periods per rotation over 360°, with the result that there is an incremental signal, but not an absolute signal.

Known from US 2005/211886 A1 and GB 1 498 409 A are devices for measuring the rotating angle of two objects rotating in relation to each other around an axis, which devices have a light source and a polarizer which rotate in relation to each other as a function of the rotating angle and, further, have a receiver which measures the luminous intensity passing through the polarizer, in order to produce a signal that is dependent on the angle of rotation. Here each receiver has at least one reception element, in front of which there is positioned a polarizing device with an initial polarization direction, while an element that casts a shadow is positioned in front of the receiver. Here the receiver has at least one quadrant diode, and means are provided for varying the shape of the shadow on the receiver over a rotation of 360°.

The goal of the invention, therefore, is to provide clarity of measurement over a full rotation of 360° for the rotating object and thus to provide an absolute angular signal, with as small as possible a loss in signal quality.

This goal is achieved with a device for measuring the rotating angle of two objects rotating in relation to each around an axis and with a process for measuring the rotating angle of two objects rotating in relation to each other around an axis.

Advantageous embodiments and elaborations of the invention are specified in the dependent claims.

BRIEF SUMMARY

The device according to the invention for measuring the rotating angle of two objects rotating in relation to each other around an axis—with a light source assigned to one of the objects; and with a polarizer assigned to the other object, such that the light source and the polarizer rotate in relation to each other as function of the rotating angle; and with a receiver which measures the luminous intensity reflected by the polarizer in order to produce a signal dependent on the rotating angle, where the receiver has at least an initial reception element, and where the light emitted by the light source is either polarized or becomes polarized, and/or a polarizing filter with an initial direction of polarization is positioned in front of the first reception element—is characterized by the fact that an element that casts a shadow is positioned in front of the receiver, and the receiver has at least one quadrant diode, and means are provided for varying the position and/or shape of the shadow on the receiver over a rotation of 360°. The means for varying the position and/or shape of the shadow produced by the element that casts a shadow on the receiver over a revolution of 360° thus cause a break in symmetry, and this can be used intentionally to generate unambiguous angle data over 360°. With the use of a quadrant diode, it is possible to read out the varying intensities on the quadrants as created by the varying position of the shadow and/or the varying shape of the shadow, and these intensities can be directly transformed into an absolute signal. A quadrant diode is understood to be the arrangement of a plurality of photosensitive areas having any shape or position on the receiver plane, where said plane preferably has at least two, and ideally a minimum of three or four photosensitive areas, which are also referred to below as quadrants. Here it is preferred that the individual quadrant surface areas are equally large in size, have an identical shape, and are symmetrically positioned on the receiver plane. In arranging the quadrant diodes on the receiver plane it is essential that, for each relative position of the two objects rotating in relation to each other, the quadrants of the quadrant diode are at least partially illuminated and at least partially shaded.

According to a preferred embodiment of the invention, the means for varying the position and/or shape of the shadow is realized in that the polarizer has a polarizing area and a non-polarizing area, and the non-polarizing area is eccentric to the rotating axis. By dividing the polarizer into a polarizing area and a non-polarizing area positioned eccentric to the rotating axis, a sinusoidal modulation of intensity is brought about, and this modulation has precisely one period for a revolution of 360°. Thus the two maximum values for luminous intensity arising during a revolution of 360° are influenced differently, and an unambiguous angular measurement is possible over 360°.

In accordance with the invention, the means for varying the position and/or shape of the shadow are realized in that the polarizer takes the form of a disk with a normal, such that the normal of the disk is positioned at an angle to the rotating axis that differs from 0°. Because the polarizer is positioned at an angle to the rotating axis that differs from 0°, the rotation of the polarizer around the axis produces a wobble, and this causes a variation in the angle of incidence of light falling on the receiver. At the least, this causes a change in the position of the shadow on the receiver. Depending on the geometric arrangement, the wobble is associated with a sinusoidal modulation in intensity of the detected luminous intensity, and this modulation has precisely one period for a revolution of 360°. The wobble thus causes a break in symmetry, which can be intentionally used to generate unambiguous angle data over 360°.

The angle will advantageously be greater than 0° and smaller than 45°, and will preferably lie between 3° and 20°; highly preferred is about 5°. Even an angle of this size will bring about a significant change in the position of the shadow on the receiver and/or a significant modulation in the luminous intensity in one or more of the reception elements, and this will permit a clear identification of the angle over 360°.

It is preferred that the element casting a shadow take the form of a semi-transparent or non-transparent element which can be produced cost-effectively. Opaque elements provide the greatest possible contrast, but even semi-transparent elements can provide a sufficiently large contrast and a clear identification of the angle over 360°.

According to a particularly preferred embodiment of the invention, the element that casts a shadow is formed by the light source, or the supporting element for the light source. A particularly cost-effective realization of the element casting the shadow can be achieved if the light source is not positioned on the plane of the receiver.

According to a particularly preferred embodiment of the invention, the element that casts a shadow is formed by a semi-transparent or opaque cover for the receiver, with a recess that is preferably round in shape. This kind of semi-transparent or opaque receiver cover also has an advantage in that it reduces the incidence of diffused light.

According to a preferred embodiment of the invention the element that casts a shadow takes the form of a support plate, particularly a circuit board, with a recess that is preferably round in shape, such that the receiver is positioned on the side of the support plate—specifically, the circuit board—that faces away from the incident light. This provides the potential for a compact design, particularly in the form of an integrated circuit.

The element that casts a shadow can basically have any desired shape. A circular geometry is preferred for the element casting a shadow, since this will permit a cost-effective production and a simplified usage.

It is preferred that the quadrant diode have at least one or two, but preferably three, four, or more quadrants, and these should each have the same surface area, as this simplifies the analysis of the detected signals.

According to a preferred embodiment of the invention, the light source has an optical axis which coincides with the rotating axis, thereby providing the device with a compact design.

The first reception element will advantageously form a part of an initial group of n-reception elements, such that a polarizing element is positioned in front of each of the n-reception elements and the polarization directions of the polarizing elements are offset in relation to each other, preferably by 180° divided by n, where n is the number of reception elements of the first group and is greater than or equal to 1. By preference, the receiver also has at least one other group, but preferably three other groups, which are each identical in design to the first group and are positioned symmetrically on the receiver. With the use of a plurality of reception elements and a preferred plurality of polarization directions, the possibility is provided for improved accuracy in the signal analysis of the device. With a plurality of reception elements, or groups having different detectable polarization directions, multiple possibilities are created for differential evaluation, e.g., for offset compensation or the minimization of local optical disturbances—for example, those caused by local diffused light or dirt on the polarizer. A plurality of reception elements or groups provides the further advantage of a redundant analysis over different optical channels.

Every two reception elements having the same polarization direction are preferably positioned in point-symmetrical fashion relative to the symmetrical axis of the receiver. Symmetrical arrangements facilitate the corresponding signal analysis.

The reception elements are positioned on at least one, and preferably two or more rectangular, and preferably square, or circular tracks that run around the symmetrical center of the receiver. This also results in a symmetrical design and facilitates the signal evaluation.

It is preferred that the reception element, or the reception elements, are parts of the quadrants belonging to the quadrant diode—such that, by preference, at least two reception elements with different polarization directions are positioned in each quadrant. To determine the incremental signal it is sufficient to have only one reception element, with one polarization direction, per quadrant. Here the reception elements of different quadrants can also have an identical polarization direction. If the individual quadrants are formed by surfaces sensitive to polarization, it is preferred that at least two different polarization directions be detected, in order to always permit an analysis of the contrast between light and shadow, despite the light's polarization. Surface space can be saved on the receiver if the reception element, or elements, are parts of the quadrant diode.

According to a preferred embodiment of the invention, the light source, the receiver, and an evaluation circuit are designed as an integrated circuit, in order to provide as a compact a device as possible.

The process according to the invention for measuring the rotating angle of two objects rotating in relation to each other around an axis, with a device according to one of the preceding claims [sic], where the luminous intensity measured by the receiver is analyzed as a signal dependent on the rotating angle, is characterized by the fact that the luminous intensities measured by the individual reception elements and the quadrant diode are evaluated as a signal dependent on the rotating angle. This affords the possibility of determining the rotating angle over a full revolution of 360°, in absolute fashion and in a simple manner.

BRIEF DESCRIPTION OF THE DRAWINGS

The invention will next be described in detail on the basis of the following figures. Shown are.

DETAILED DESCRIPTION

Figure 1:
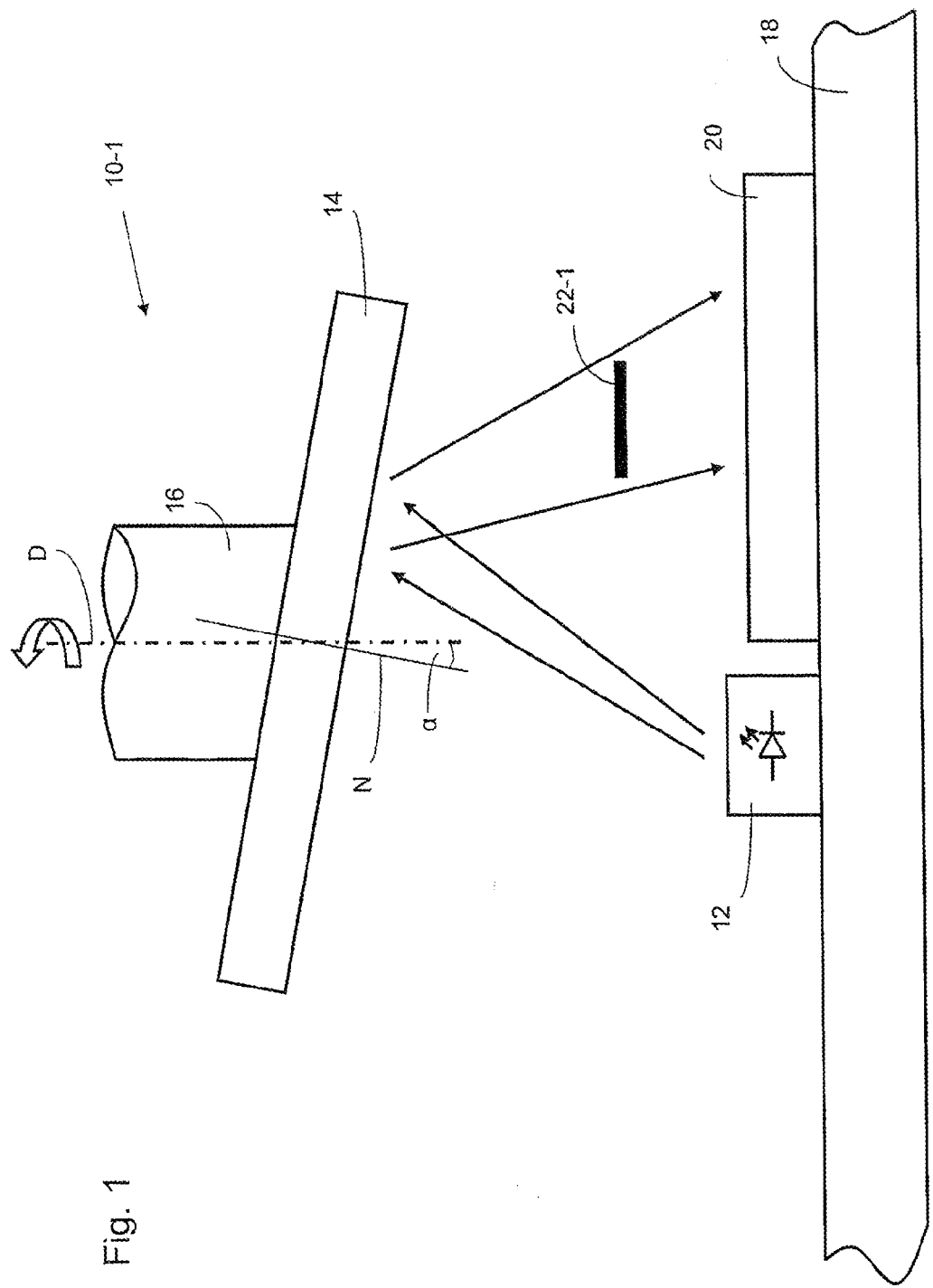
FIG. 1 a schematic depiction of a device for measuring the rotating angle of two objects rotating in relation to each other, according to an initial embodiment of the invention FIG. 2 a schematic depiction of a device for measuring the rotating angle of two objects rotating in relation to each other, according to a second embodiment of the invention FIG. 3 a schematic depiction of a device for measuring the rotating angle of two objects rotating in relation to each other, according to a third embodiment of the invention FIG. 4 a schematic depiction of a device for measuring the rotating angle of two objects rotating in relation to each other, according to a fourth embodiment of the invention FIG. 5 a schematic depiction of an initial embodiment of a receiver for a device according to one of FIGS. 1 to 4

FIG. 1 provides a schematic depiction of a device 10-1 for measuring the rotating angle of two objects rotating in relation to each other around an axis D, and in particular, for measuring the rotating angle of a shaft 16 rotating around the axis D relative to a stationary object, such as, e.g., the environment, a housing, or a supporting element. Positioned on the shaft 16 is a polarizer 14, which is designed as a linear polarizer. In particular, the polarizer 14 takes the form of a disk and has normal N, which is positioned at an angle α to the axis D. Thus, the polarizer 14 is tipped toward the axis D. The polarizer 14 can be advantageously designed as a round disk. As an alternative, the polarizer 14 can take any form that is desired. Furthermore, the polarizer 14 can be positioned on the shaft 16 in such a way that the normal N does not necessarily have a point of intersection with the rotating axis D. As shown in FIG. 1, the polarizer is positioned on the front side of the shaft 16. As an alternative, the shaft 16 can be guided through an opening in the polarizer 14. This specifically permits the shaft 16 to take the form of a hollow shaft.

The polarizer 15 has a reflective design and, in particular, can be constructed to reflect like a mirror. Or it can be diffusely or dispersively reflective. In an alternative embodiment (not shown), the polarizer 14 can also have a transmissive design.

The polarizer 14 is illuminated by a light source 12. The light source 12 has an optical axis which can coincide with the rotating axis D. By preference, the light source 12 is designed as an unpolarized light source 12, e.g., as an incandescent lamp or LED—or it may be designed as a coherent light source, e.g., as a laser or a laser diode. In particular, the light source 12 emits a divergent cone of light, in order to extensively illuminate the polarizer 14. In particular, the light cone from the light source 12 is homogeneous. By preference, the luminosity profile of the light source 12 is rotationally symmetrical and has its core area on the optical axis. The light source 12 can be designed to illuminate steadily or in a pulsed manner.

The device 10-1 has a receiver 20, which is positioned on a supporting element 18. The light from the light source 12 is polarized in linear fashion by the polarizer 14 and is reflected so that it falls on the receiver 20. The receiver 20 has at least one reception element with a polarizing filter having an initial direction of polarization. Upon rotation of the shaft 16, and thus of the polarizer 14, over 360°, a reception element belonging to the receiver detects a sine-squared intensity distribution.

In the embodiment of the device 10-1 shown in FIG. 1, the light source 12 is positioned next to the receiver 20 on the supporting element 18. In front of the receiver 20 an element that casts a shadow 22-1 is positioned at a distance, specifically between the receiver 20 and the polarizer 14. This arrangement can be realized by means of a spacer, which is not depicted. The element 22-1 that throws a shadow masks out a portion of the light that falls from the light source 12 onto the polarizer 14 and that is reflected by the polarizer 13 in the direction of the receiver 20, and throws a shadow on the receiver 20. The element casting a shadow 22-1 can have any desired shape, but by preference is round or rectangular.

Because the polarizer 14 is tipped toward the rotating axis D, there is a wobble in the polarizer 14, and this produces a variation in the angle of incidence of the light falling on the receiver. This wobble in the polarizer 14 varies the position and/or the shape of the shadow cast on the receiver by the element 22-1 casting a shadow. Depending on the geometrical arrangement, the wobble causes the luminous intensity on a polarization-sensitive reception element to be sinusoidally modulated over one revolution of 360°, with the result that the intensity maxima (there are a minimum of two) arising over a revolution of 360° have different magnitudes.

Figure 2:
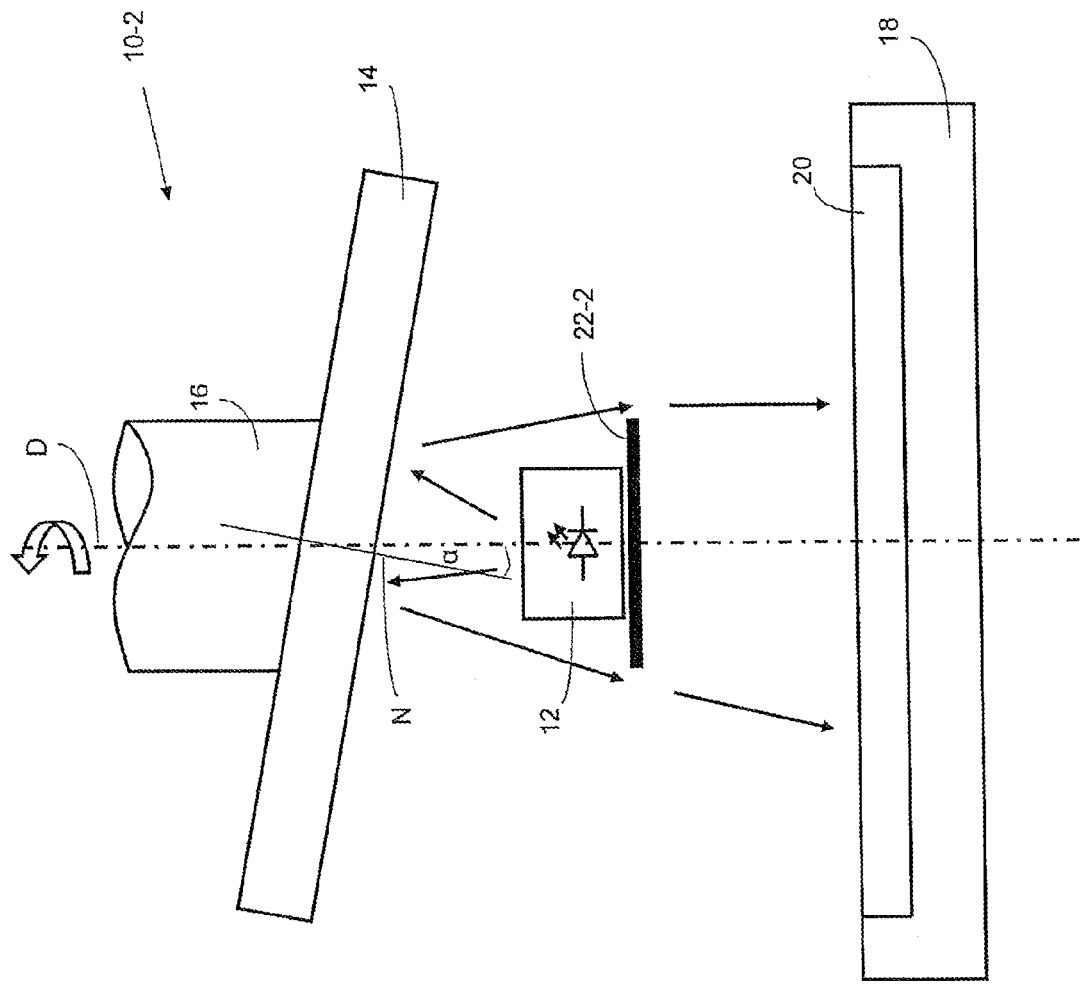

FIG. 2 depicts another exemplary embodiment of a device 10-2, which basically differs from the device 10-1 shown in FIG. 1 in that the light source 12 between the supporting element 18 and the shaft 16 is positioned at distance from the supporting element 18. The light source 12 here is by preference positioned in such a way that the optical axis of the light source 12 basically coincides with the rotating axis D. The light source 12 is positioned on a supporting element which forms the element 22-2 that casts a shadow. As an alternative, the light source 12 can itself form the element 22-2 that casts a shadow. Because the light source 12 is positioned between the receiver 20 and the polarizer 14, the light source 12, or the shadow-casting element 22-1, casts a shadow on the receiver 20. As a result of the wobble in the polarizer, the position of the shadow on the receiver 20 is modified. If the element 22-2 casting a shadow is—as preferred—positioned in rotationally symmetrical fashion relative to the rotating axis D and, in particular, is circular in shape, a circular shadow arises, and this shadow moves in a circular path around the rotating axis D upon rotation of the polarizer 14.

Figure 3:
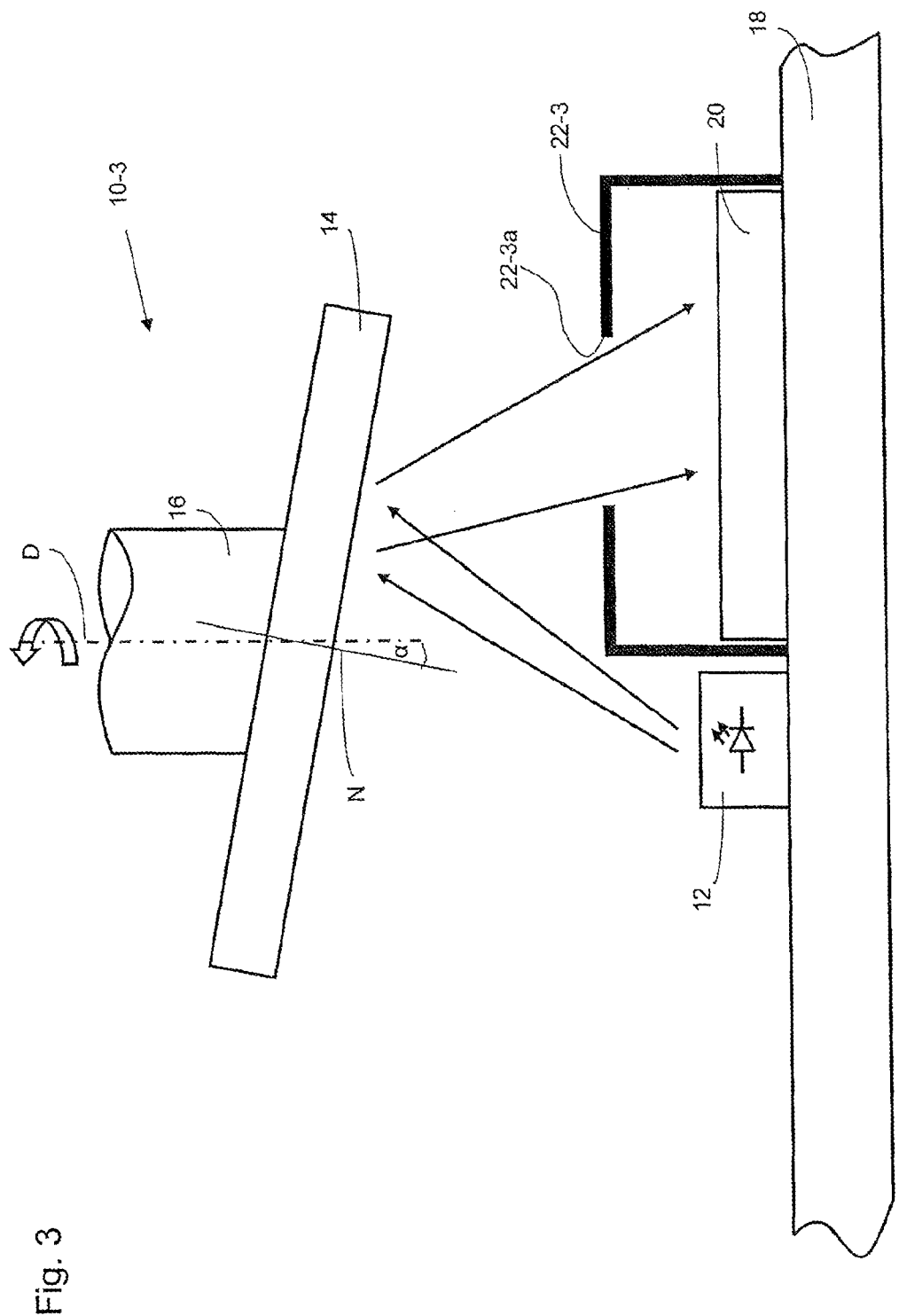

FIG. 3 shows another exemplary embodiment of a device 10-3, which differs from the device 10-1 shown in FIG. 1 only in the physical form of the shadow-casting element 22-3. The device 10-3 has a shadow-casting element 22-3 which takes the form of an opaque housing which is positioned around the receiver 20, and this housing has an opening on its lid which allows light to fall into the interior of the housing and onto the receiver 20. If the opening 22-3a is round in shape, the result will ideally be a round or oval luminous spot, which migrates in a circular or elliptical path around the rotating axis D upon revolution of the polarizer 14. With a corresponding relative arrangement between the light source 12, the receiver 20, and the rotating axis D with the polarizer 14, and with a corresponding design for the opening 22-3a, a round luminous spot, which moves in a circular path, can ideally be produced.

Figure 4:
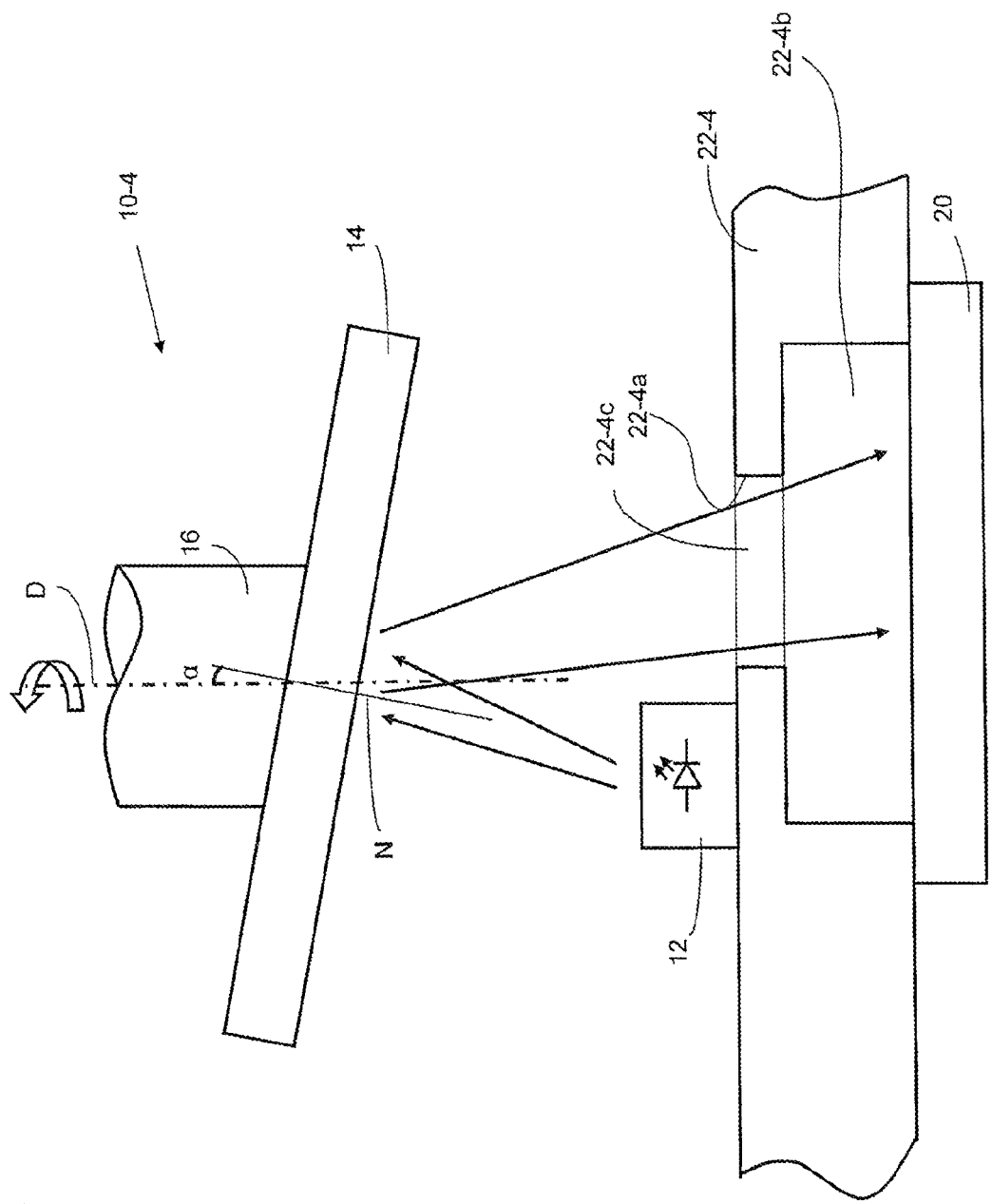

FIG. 4 depicts another exemplary embodiment of a device 10-4, with another exemplary embodiment of an element 22-4 which casts a shadow and which forms the supporting element for the receiver 20. However, the receiver 20 here is positioned on the side of the supporting element (i.e., of the shadow-casting element 22-4) that is turned away from the polarizer 14 or the incidence of light. The shadow-casting element 22-4 has an opening 22-4a, through which light coming from the polarizer 14 can fall onto the receiver 20. The opening 22-4a has a first section 22-4b, with a larger diameter, which is positioned directly in front of the receiver 20, and a second section 22-4c, with a smaller diameter, which is positioned on the side of the supporting element that faces the polarizer 14. The second section 22-4c functions as a diaphragm and a beam-limiting element and thus, in particular, as an actual shadow-casting section—while the first section 22-4b ensures that the generated luminous spot is displayed on the receiver without further shadowing while the position of the spot changes. In this embodiment the element 22-4 that casts a shadow preferably forms the supporting element for the light source 12, as well. The supporting element is designed, in particular, as a circuit board, and this provides the potential for creating an integrated circuit.

It is also possible to employ a plurality of shadow-casting elements. The shadow-casting element can assume any desired shape. A round or annular shape is preferred, however, in order to simplify the signal analysis and the manufacturing process.

The light source 12, the receiver 20, and the element casting the shadow are preferably integrated on a chip, in order to provide as a compact a system as possible.

The movement of the shadow or the luminous spot is detected with an inventive embodiment of the receiver 20 which is as described in the following on the basis of FIGS. 5 to 8. FIGS. 5 to 8 depict four different embodiments of receivers 20, and each of the receivers shown there can be employed in any of the devices shown in FIGS. 1 to 4.

Figure 5:
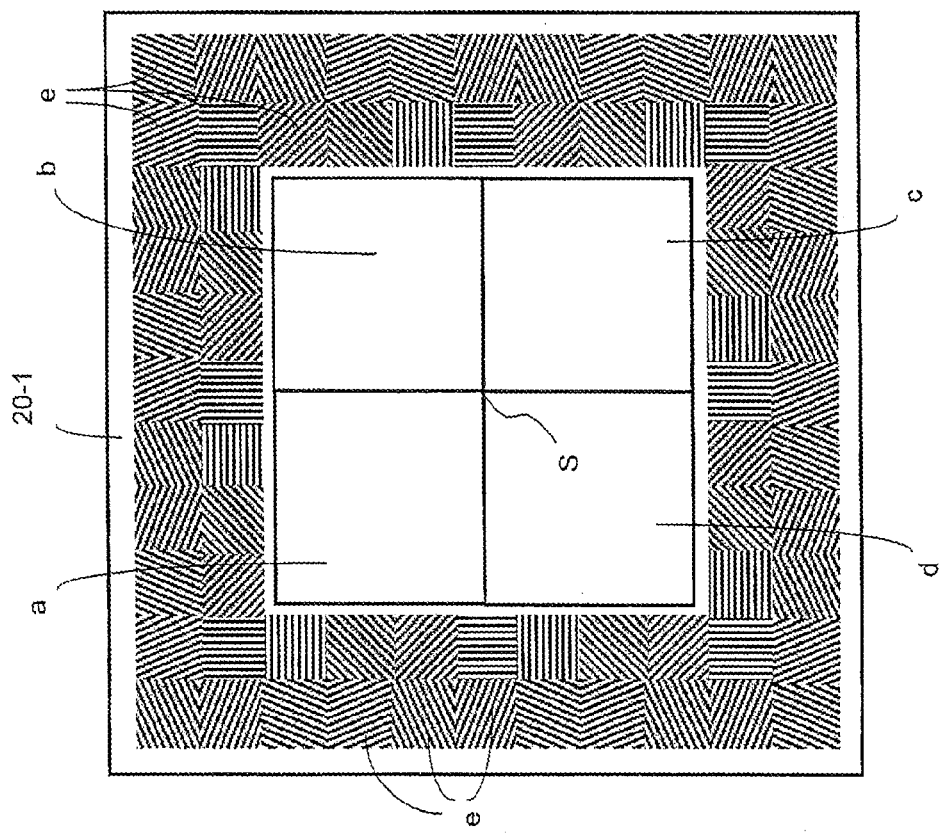

FIG. 5 gives a schematic depiction of a first exemplary embodiment of a receiver 20-1, which has a square shape. Positioned in the inner area is a quadrant diode 24-1, with four quadrants a, b, c, d. The quadrant diode 24-1 here is a square configuration of four extensive, identical, and, in particular, square photosensitive areas, specifically diodes. The photosensitive areas are positioned close together, so that basically there is only a narrow, cross-shaped gap between the quadrants a, b, c, d. The center of the cross-shaped gap creates a symmetrical center S.

The position of the shadow or the luminous spot on the quadrant diode 20-1 is ascertained by comparing the currents detected in the given quadrants a, b, c, d. The ratio of the currents in the given quadrants a, b, c, d provides information on the occupancy of each quadrant a, b, c, d, and the position of the shadow or luminous spot can thereby be determined.

Around the quadrant diode 24-1 there is positioned at least one reception element e, and in the depicted embodiment a plurality of reception elements 3, and in front of these reception elements 3 there are positioned polarization filters with at least one direction of polarization, and in the present case eight different directions of polarization. The polarization directions are preferably offset by 180°/n, or 180°/8=22.5° in the present example.

Every two reception elements e with the same direction of polarization are positioned in point-symmetrical fashion relative to the symmetrical center S of the receiver 20-1. The reception elements e of the receiver 20-1 are positioned on two square tracks around the symmetrical center S of the receiver 20-1.

In a reception element e of the receiver 20-1, in front of which is positioned a polarization filter with a first polarization direction, there arises a sign-squared intensity signal. With this alone, to be sure, it is still not possible to make an absolute determination of the angle over 360°. By ascertaining the position of the luminous spot or shadow through the quadrant diode it is possible to unambiguously determine the angle over 360° in absolute fashion.

The plurality of reception elements e, preferably with different polarization directions, improves the accuracy of the angle determination and provides further options for correcting the detected signals, removing errors, and—if need be—providing redundant optical channels. Averages can be taken using the signals of a plurality of reception elements e having the same polarization direction, in order to improve the signal analysis. In addition, it is possible to form groups of reception elements e, inside of which are positioned only reception elements e with different polarization directions, and this option provides further possibilities for the signal analysis.

Figure 6:
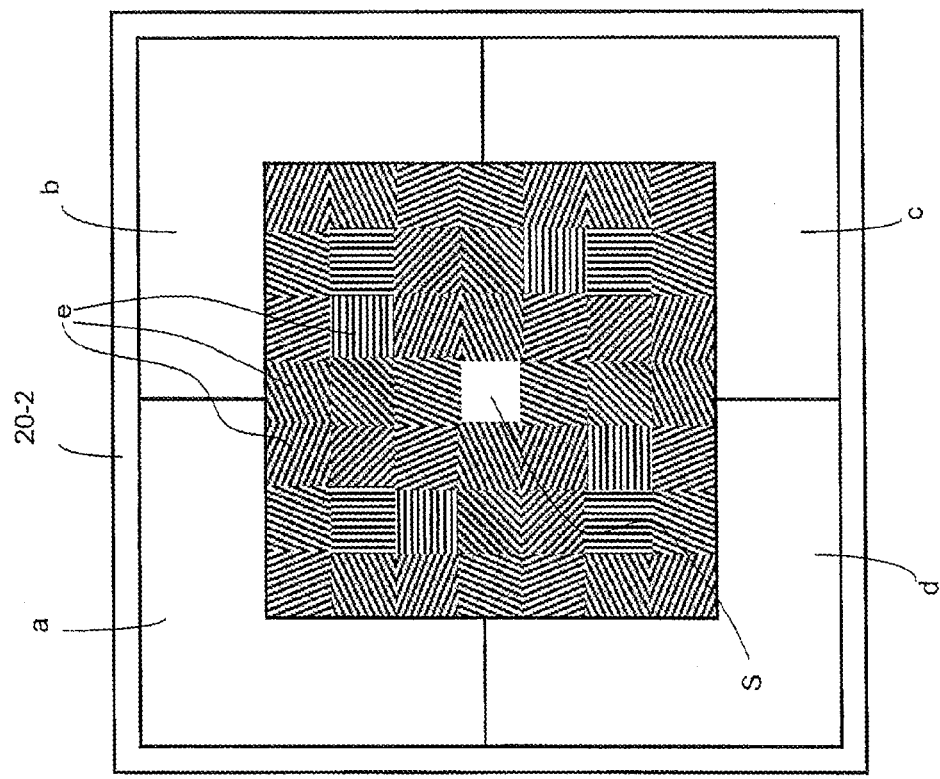
FIG. 6 a schematic depiction of a second embodiment of a receiver for a device according to one of FIGS. 1 to 4

FIG. 6 shows a second exemplary embodiment of a receiver 20-2, with another exemplary embodiment of a quadrant diode 24-2 having quadrants a, b, c, d. On the inside, the receiver 20-2 has an area with reception elements e with different directions of polarization. In particular, there are 48 receptions elements e positioned on three concentric tracks around a symmetrical center S. Reception elements e with the same polarization direction are arranged on the individual tracks in point-symmetrical fashion around the symmetrical center S.

The four quadrants a, b, c, d of the quadrant diode 24-1 are positioned around the inner area having the 48 receptions elements e. The quadrants a, b, c, d are L-shaped in form, with legs of equal length. The quadrants a, b, c, d form a frame around the inner area with the reception elements e. With a quadrant diode 24-2 of this type it is again possible to ascertain the position of a luminous spot or shadow that wobbles over the receiver 20-2. Such a configuration of quadrants a, b, c, d is of particular advantage for a ring-shaped luminous spot.

Figure 7:
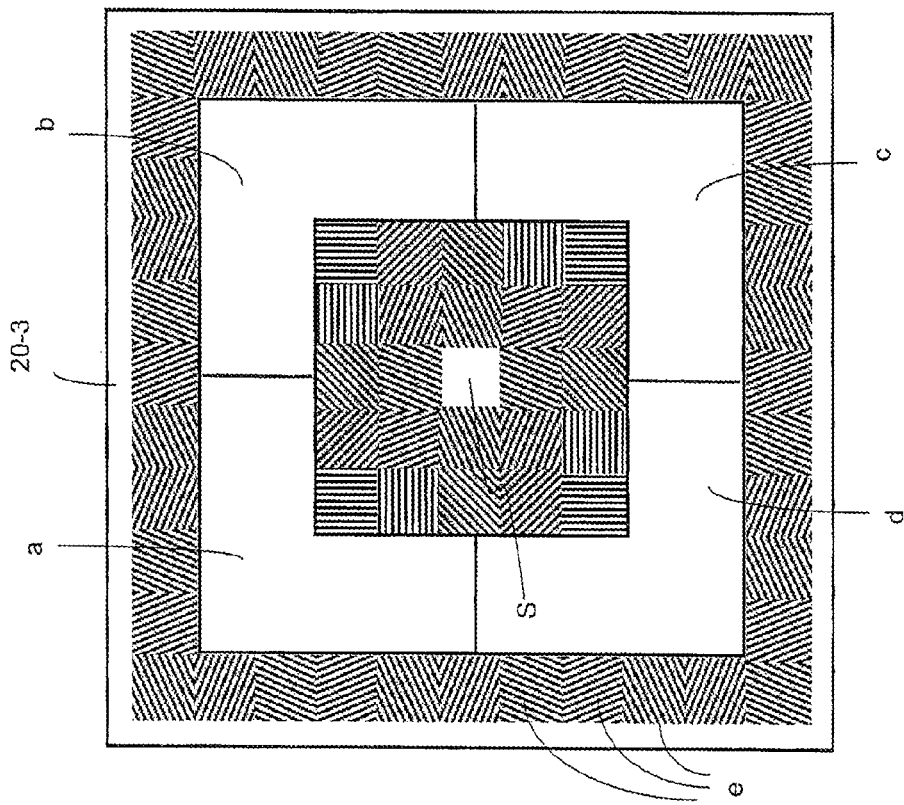
FIG. 7 a schematic depiction of a third embodiment of a receiver for a device according to one of FIGS. 1 to 4

FIG. 7 depicts another exemplary embodiment of a receiver 20-3, having a quadrant diode 24-3 with quadrants a, b, c, d. The layout of the quadrant diode 24-3 basically corresponds to the quadrant diode 24-2 of the exemplary embodiment of the receiver 20-2 shown in FIG. 6. Within the inner area inside the quadrants a, b, c, d there are, to be sure, only 24 reception elements e, arranged on two concentric square tracks around the symmetrical center S. In addition, the receiver 20-3 has a third track of reception elements e which are positioned concentrically around the symmetrical center S and which border the quadrants a, b, c, d on the outside.

Figure 8:
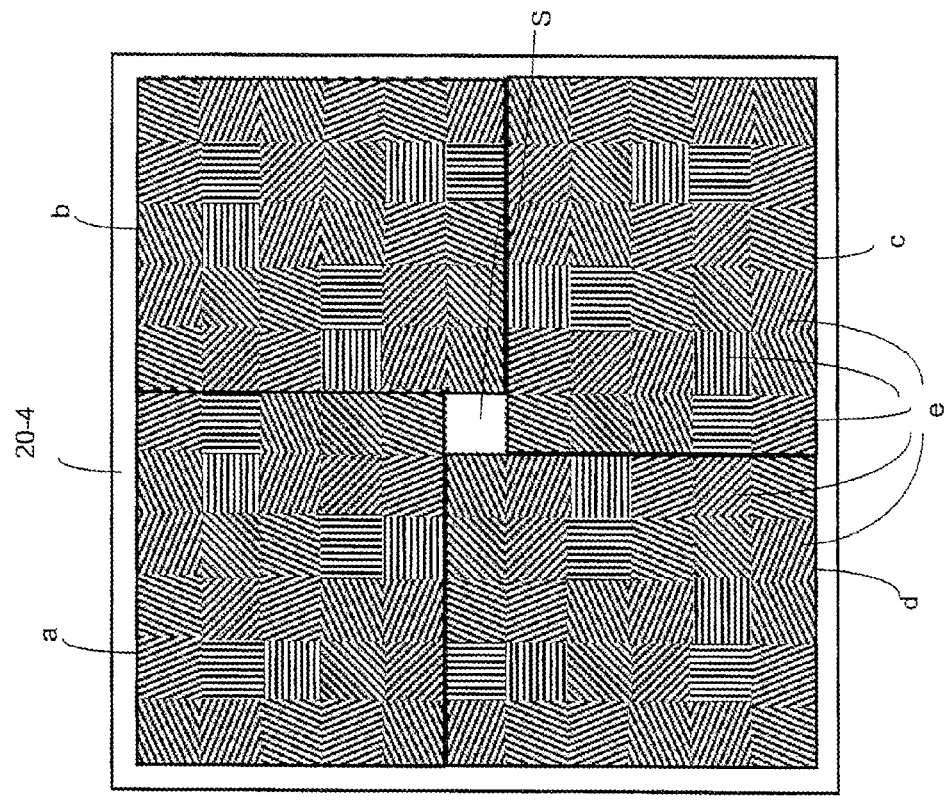
FIG. 8 a schematic depiction of a fourth embodiment of a receiver for a device according to one of FIGS. 1 to 4

FIG. 8 shows a fourth exemplary embodiment of a receiver 20-4 with a quadrant diode 24-4 having quadrants a, b, c, d. In this exemplary embodiment the reception elements e are part of the quadrants a, b, c, d. Each quadrant a, b, c, d has 30 reception elements e. To determine the position of the luminous spot or shadow, the signal for an individual quadrant a, b, c, d is determined as the sum signal of all reception elements e positioned in the given quadrant a, b, c, d.

It must be emphasized that the shape and area of the quadrants a, b, c, d of the quadrant diodes 24-1, 24-2, 24-3, 24-4 can be freely chosen. For a simplified signal analysis, the areas of the quadrants a, b, c, d will each be identical and, as a special preference, of the same shape. In FIGS. 5 to 8, only square or rectangular embodiments are depicted. It is understood that round or oval configurations are also conceivable, and here the quadrants a, b, c, d will be designed as circular segments.

In addition, FIGS. 5 to 8 show only quadrant diodes 24-1, 24-2, 24-3, 24-4 having four quadrants a, b, c, d. However, quadrant diodes with three quadrants or with more than four quadrants are also conceivable, and these again will preferably have identical areas and, in particular, identical shapes.

In alternative embodiments a plurality of quadrant diodes can also be positioned on one receiver. In addition, the quadrants of the quadrant arrangement can each be divided into discrete individual reception elements. This allows a dynamic position, shape, and size to be realized for the individual quadrants and thus for the quadrant diode arrangement.

LIST OF REFERENCE NUMERALS 10-1 device
10-2 device
10-3 device
10-4 device
12 light source
14 polarizer
16 shaft 18 supporting element
20 receiver
20-1 receiver
20-2 receiver
20-3 receiver
20-4 receiver
22-1 element casting a shadow
22-2 element casting a shadow
22-3 element casting a shadow
22-3a opening
22-4 element casting a shadow
22-4a opening
22-4b first section
22-4c second section
24-1 quadrant diode
24-2 quadrant diode
24-3 quadrant diode
24-4 quadrant diode
a, b, c, d quadrant
e reception element
S symmetrical center
D rotating axis
N normal
α angle

The invention claimed is:

1. A device for measuring a rotating angle of two objects rotating in relation to each other around an axis, with a light source; with a polarizer such that the light source and the polarizer rotate in relation to each other as function of the rotating angle; and with a receiver which measures the luminous intensity reflected by the polarizer, in order to produce a signal dependent on the rotating angle;
where the receiver has at least one initial reception element; and
where the light emitted by the light source is polarized, and/or a polarizing filter with an initial direction of polarization is positioned in front of a first reception element, or
the light emitted by the light source becomes polarized, and/or the polarizing filter with the initial direction of polarization is positioned in front of the first reception element; and
where at least one element that casts a shadow is positioned in front of the receiver; and
the receiver has at least one quadrant diode, wherein the position and/or shape of the shadow on the receiver varies as the polarizer rotates 360°, wherein
the polarizer takes the form of a disk with a normal, such that the normal of the disk is positioned at angle to the rotating axis that differs from 0°.

2. The device according to claim 1, wherein the angle is greater than 0° and smaller than 45°, and is preferably about 5°.

3. The device according to claim 1, wherein the element casting a shadow is designed as a translucent or opaque element.

4. The device according to claim 1, wherein element casting the shadow is formed by the light source or the supporting element for the light source.

5. The device according to claim 1, wherein the element casting a shadow is designed as a translucent or opaque cover for the receiver and said cover has an opening.

6. The device according to claim 1, wherein the element casting a shadow is designed as a support plate, including a circuit board, having an opening, such that the receiver is positioned on the side of the support plate including the circuit board, that faces away from the incident light.

7. The device according to claim 1, wherein the element that casts a shadow is circular in shape.

8. The device according to claim 1, wherein the quadrant diode has one two, three, four, or more quadrants, which have equivalent surface dimensions.

9. The device according to claim 1, wherein the light source has an optical axis which coincides with the rotating axis.

10. The device according to claim 1, wherein the first reception element is part of an initial group of n reception elements, such that a polarizing element is positioned in front of each of the n reception elements, and the polarization directions of the polarizing elements are offset in relation to each other, by 180° divided by n, where n is the number of reception elements e of the first group and is greater than or equal to 1, and the receiver has at least one other group which is identical in design to the first group and is arranged in symmetrical fashion on the receiver.

11. The device according to claim 10, wherein every two reception elements with the same polarization direction are positioned in point-symmetrical fashion relative to a symmetrical center of the receiver.

12. The device according to claim 10, wherein the reception elements are positioned on at least one rectangular, square or circular track around a symmetrical center of the receiver.

13. The device according to claim 1, wherein the reception element, or the reception elements, are parts of the quadrants of the quadrant diode, such that at least two reception elements with different polarization directions are positioned in each quadrant.

14. The device according to claim 1, wherein the light source, the receiver, and an evaluating circuit are designed as an integrated circuit.

15. A process for measuring the rotating angle of two objects rotating in relation to each other around an axis D, with a device according to claim 1, such that the luminous intensity measured by the receiver is evaluated as an angle-dependent signal, wherein
the luminous intensities measured by the individual reception elements and by the quadrant diode are evaluated as an angle-dependent signal.

* * * * *